United States Patent [19]

Knapp

[11] 4,414,813
[45] Nov. 15, 1983

[54] POWER GENERATOR SYSTEM

[76] Inventor: Hans J. Knapp, 4335 SW. Altadena Ave., Portland, Oreg. 97201

[21] Appl. No.: 277,026

[22] Filed: Jun. 24, 1981

[51] Int. Cl.³ .................. F01K 23/02; F01K 27/02
[52] U.S. Cl. ............................ 60/655; 60/648; 60/670; 60/39.182
[58] Field of Search ............ 60/648, 655, 670, 39.182

[56] References Cited

U.S. PATENT DOCUMENTS

| | | | |
|---|---|---|---|
| 1,993,585 | 3/1935 | Baumann et al. | 60/655 |
| 2,404,938 | 7/1946 | Armacost et al. | 60/655 X |
| 2,471,755 | 5/1949 | Karrer | 60/655 |
| 2,486,291 | 10/1949 | Karrer | 60/655 |
| 4,290,269 | 9/1981 | Hedstrom et al. | 60/670 |
| 4,291,539 | 9/1981 | Potter | 60/670 |

Primary Examiner—Allen M. Ostrager
Attorney, Agent, or Firm—Seed and Berry

[57] ABSTRACT

A combined cycle (Brayton and Rankine) system for generating electrical power is disclosed. A gas turbine directly connected to an electrical generator is powered by compressed heated air, the air heated, after passing through the compressor section of the turbine, by passage through a high temperature gas-to-air heat exchanger through which hot combustion flue gases (by burning a biomass or other fuel) are also passed. The flue gases, after passage through the heat exchanger, are used to generate steam for powering a steam turbine or for other purposes.

10 Claims, 3 Drawing Figures

4,414,813

POWER GENERATOR SYSTEM

DESCRIPTION

1. Technical Field

This invention relates to a power generation system including use of means for firing biomass fuel and using the heated combustion gases from such firing to feed to a combined cycled, indirectly heated gas turbine in combination with steam generation for an overall efficiency comparable to a co-generation facility—without the need for co-generation.

2. Background Art

About 40 percent of the fuel consumed in the United States goes to produce low temperature heat. Much of this heat could be, but is not, used to generate electricity and/or steam. It has been estimated that, if use of this low temperature heat to generate electricity and steam were done on a significant scale, one-fourth of the country's oil imports could be displaced. Ross, Marc H. and Williams, Robert H., *Our Energy: Regaining Control*, McGraw-Hill 1980.

Since the conception of the conversion of steam into electric power in the 19th Century, the efficiency of heat conversion of steam to electrical power has increased from approximately 11 percent to 40 percent. This efficiency improvement is related to advances in material technology which allowed the creation of higher temperature, higher pressure steam generators and steam turbines. These advances in efficiency have been supplemented by the addition of feed water heaters, economizers, superheaters, reheaters, and combustion air heaters. A 40 percent efficiency in a condensing cycle plant, for example, which corresponds to a station heat rate of about 8,500 Btu/KW-hr, applies only to a few of the largest and most expensive utility generating plants, with capital costs ranging from 500 million to 1 billion dollars per plant. Industrial boiler plants make power on the scale of 10–25 megawatts, have station heat rates considerably higher, i.e., 15,000–20,000 Btu/KW-hr, and are, therefore, less efficient. The overall efficiency of such small-scale plants is on the order of 25–28 percent, which is also typical for existing wood-fired boilers.

Although substantial progress has been made in upgrading the efficiency of the steam cycle, at the present time at least 60 percent of the energy delivered to utility thermal power plants (whether nuclear, coal, oil or gas fired) is wasted. This low efficiency results from the fact that much of the energy used to vaporize the water cannot be recovered. Additionally, in small-scale systems, this problem is aggravated by limitations on commercially available equipment. In such small-scale systems, superheated steam is usually generated at 650–800 psia and 900° F., rather than at 2,450 psia and 1,000° F., as is true in larger scale plants. It is for this reason that the efficiency of the steam cycle in small-scale systems is approximately 28 percent rather than the 40 percent theoretically obtainable in the larger systems. If this 28 percent efficiency is coupled with a boiler thermal efficiency of 60–70 percent, which is typical for wood-fired boilers, the resulting station efficiency is on the order of 19 percent, for a station heat rate of 18,000 Btu/KW-hr. However, if a small-scale steam powered electrical generating plant is near a processing plant with steam requirements, such as a pulp or papermill, so that the spent steam can be used without water-cooled condensers, then the rejected heat to the cooling towers and cooling ponds is eliminated, saving all or part of the condenser cooling energy. Unfortunately, the need for processed steam is limited to certain manufacturing facilities and does not apply to residential users of electricity, nor to heavy users of electricity, such as the aluminum industry. Thus the demand for electricity far exceeds the need for process steam by industry—at least those within a reasonable steam transmission distance of the electrical power generating facilities operated by public utilities.

For these reasons, a process is needed which will provide small-scale users with a means for generating electric power more efficiently than a conventional cycle.

"Combined cycle" refers to the combination of two thermodynamic cycles, the Brayton (simple cycle gas turbine) and the Rankine (steam cycle). Solar Turbines International, an operating group of International Harvester Company, has marketed combined cycle equipment since the early 1960's. The combined cycle system of Solar incorporates a standard solar gas turbine engine fired directly by a clean burning fuel (the driven load) and a steam generator which utilizes turbine exhaust energy to produce steam. The steam turbine provides additional power to the driven load shaft. The combined cycle power plant recovers gas turbine exhaust energy that is normally lost to the atmosphere and converts it to usable steam turbine shaft power.

DISCLOSURE OF THE INVENTION

This invention is directed to a combined cycle system utilizing two types of generating systems, an indirectly fired gas turbine in combination with a steam turbine, so that the overall efficiency of the system exceeds the overall efficiency of the individual gas and/or steam turbine.

It is a principal object of this invention to provide an energy conversion system using a gas turbine run on gases heated by a high temperature gas-to-gas heat exchanger by hot combustion flue gases.

It is a further object of this invention to provide an energy conversion systeom which permits the direct burning of biomass to produce electrical power without significant air pollution.

It is a further object of this invention to provide an efficient means of producing electrical power and heat for drying biomass prior to combustion of the biomass or for drying biomass prior to pelletizing such to form a biomass fuel.

These and other objects are accomplished by routing heated combustion flue gases through a high temperature gas-to-gas heat exchanger through which gas at ambient temperature destined to operate the gas turbine is drawn, heated and then passed through the gas turbine, the gas turbine connected to an electrical generator. The heated gases discharged from the gas turbine are then used to generate steam for production of electrical energy or for other purposes. The combination of the indirectly heated gas turbine and steam generating means is best used in conjunction with cyclonic burners firing biomass fuel which use substantial amounts of excess air, on the order of 200–800 percent. The overall system, when used in conjunction with cyclonic burners firing biomass fuel, eliminates the penalties associated with boiler stack gas losses created by the excessive combustion air in a cyclone furnace. This is accomplished by omitting the boiler stack and thereby omitting all of the boiler stack losses.

BEST MODE FOR CARRYING OUT THE INVENTION

Figure 1:
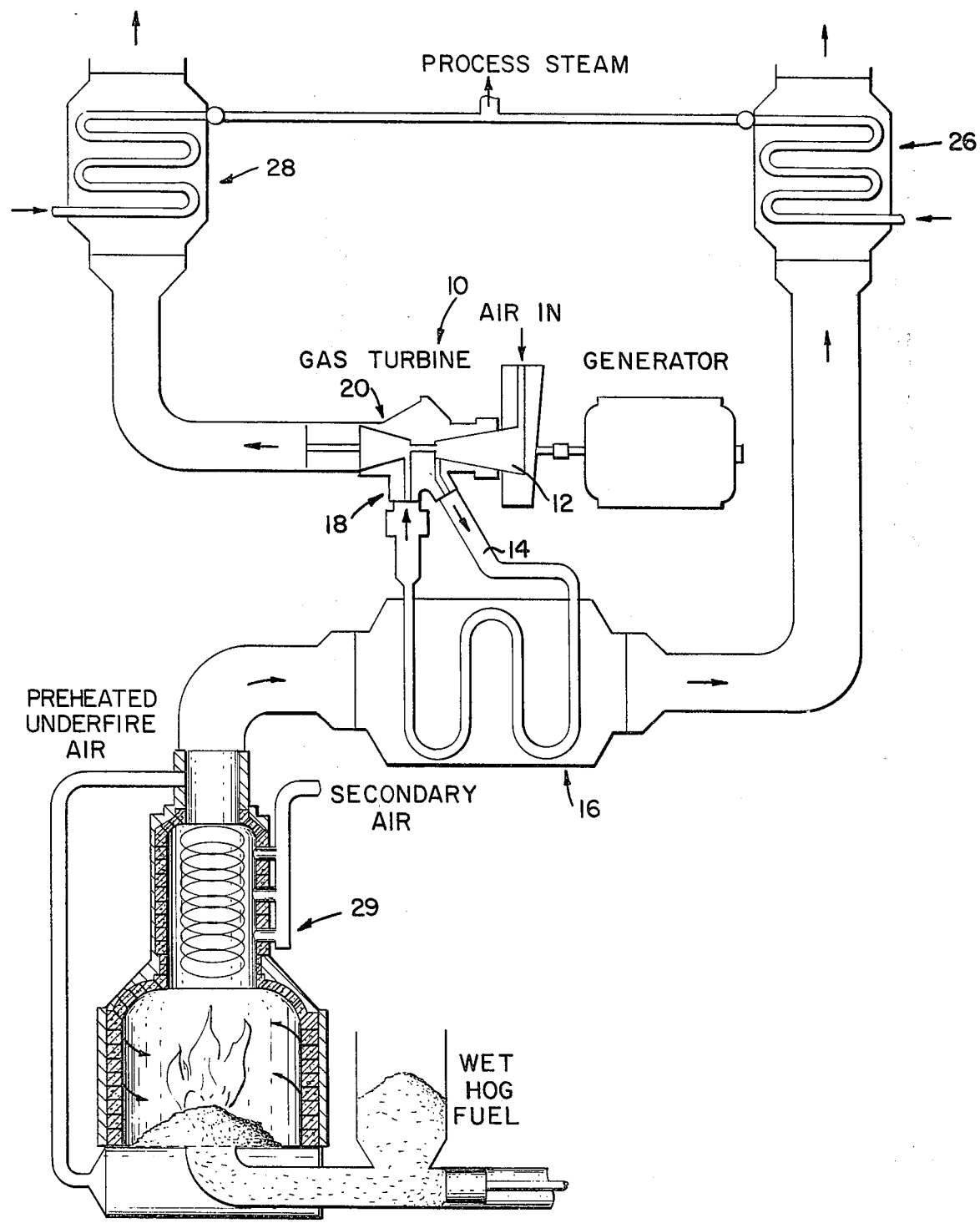
FIG. 1 is a schematic of an indirectly heated air turbine with the exhaust heat used to generate process steam.

The power generating efficiency of an energy conversion system has been improved by use of a combined cycle system. By a "combined cycle" system is meant combining two types of generating systems, for example, the use of a gas turbine in combination with a steam turbine. Since the gas turbine is conventionally directly fired by its own built-in combustor, the combustion gases generated are expanded through the gas turbine without the need for water, steam or working fluid employed in a conventional steam generating facility. This eliminates the need for water or water condensers and their associated losses. However, the gas turbine itself has losses of its own since the gas does not have the large heat transmission capabilities of steam. As a result, the exhaust discharge of a gas turbine on an open cycle basis represents 65–70 percent heat loss. A gas turbine burning, for example, 32 million Btu's of fuel per hour will eject heat out of its exhaust at 22 million Btu's per hour. Thus, on its own, a gas turbine generator is less efficient than a steam turbine generator. If, however, a steam turbine generator is combined with a gas turbine generator, the overall efficiency of the combined system exceeds the overall efficiency of the individual systems.

By combining a steam generator and gas generator as described in this application, the efficiency of the gas turbine is increased to approximately 25–65 percent. The steam cycle (in a condensing mode) still loses 60 percent of its energy to its condensers as before; however, the loss is only 60 percent of the portion of power generated by the steam rather than the overall amount. Thus the overall efficiency of the combination exceeds the efficiency of the largest thermal steam generator plants operating in a condensing mode. Some large utilities are also beginning to supplement their steam generating capacity with supplemental gas turbines having attached waste heat boilers which may be additionally boosted with direct firing in order to raise the waste heat boiler temperature and pressure beyond the pressure/temperature range available from the gas turbine exhaust stream.

Solar Turbines International has marketed a "recuperative" gas turbine which saves fuel by passing exhaust heat leaving the turbine at about 455° C. (850° F.) through a heat exchanger to preheat air before it reaches the combustion chamber of the gas turbine.

In the Solar Turbines International system, the gas turbine is directly fired with an internal combustor. The atmospheric air pulled in by the turbine air compressor is heated to approximately 590° F. and 125 psi. Natural gas or diesel fuel, pumped under pressure to the combustion chamber of the turbine, expands the air/fuel mixture to approximately 600° F. and then transmits the power turbine exhaust at slight back pressure at about 800° F. The disadvantage of direct firing the turbine is that it must be fired with a clean burning fuel, such as natural gas or diesel fuel, to prevent fouling, corrosion, and erosion of the turbine blades. These fuels are expensive, in the range of $3–7/MBtu. No gas turbines in constant commercial use utilize furnace flue gases or biomass combustion gases because of their entrained contaminants. Although it is possible to clean such gases, the cost of cleaning and pressurizing the hot gases for direct turbine firing is not feasible economically. Additionally, problems which may occur in combusting biomass or other fuel could ruin turbine blading on a multimillion dollar turbine in a matter of hours.

In the system described in this application, a temperature air-to-gas heat exchanger is used to heat air used to heat the turbine to about 1450° F. by the combustion flue gas stream from the furnace, generally at a temperature of 1600°–1650° F. The waste heat exiting the gas turbine has no contaminants or pollutants since it is merely heated air and can be used for numerous purposes, i.e, to generate steam, to preheat combustion air for the gas turbine, to predry biomass fuel, to heat a waste heat boiler downstream from the air turbine, or to be blended with ambient air for kiln drying of lumber or veneer used in the production of plywood.

FIG. 1 of the drawings illustrates the basic unit of the system described in this application, an indirectly heated gas turbine. Air at ambient temperature is drawn into the compressor section 12 of a gas turbine 10 wherein it is compressed to a pressure of about 100–150 psia and is then directed through line 14 to a high temperature gas-to-air heat exchanger 16. Hot flue gases at temperatures ranging from 1400°–1800° F. are directed through the heat exchanger, the hot flue gases resulting from direct firing of biomass fuel or other fuel in a furnace. The heated air, after passage through the gas-to-air heat exchanger 16, enters the power turbine section 20 of the gas turbine through line 18 at a temperature ranging from 1400°–1600° F. and 100–150 psi. The output shaft 22 of the gas turbine is connected through a gear box to an electrical generator 24. The exhaust gas stream exiting the power turbine section as waste heat in the form of clean, heated air can be used, after passage through a heat exchanger 28, to generate low pressure steam in a boiler, to preheat combustion air for the furnace, to dry biomass fuel prior to being fired, to dry biomass fuel prior to running the fuel through a pelletizing operation to form a pelletized fuel, or to kiln dry lumber or veneer. The residual heat contained in the combustion flue gas stream passing through the heat exchanger 16 may be directed to a boiler for generation of steam for electric energy production or for other purposes.

A conventional gas turbine can be used which is fitted with a diverter to divert ambient air coming into the compressor section of the turbine to the heat exchanger and to return the heated air from the heat exchanger to the power section of the turbine. The furnace 29, shown in FIG. 1, is a Lamb/Cargate well-cell burner for burning wet hog fuel; however, any type of furnace may be employed.

Figure 2:
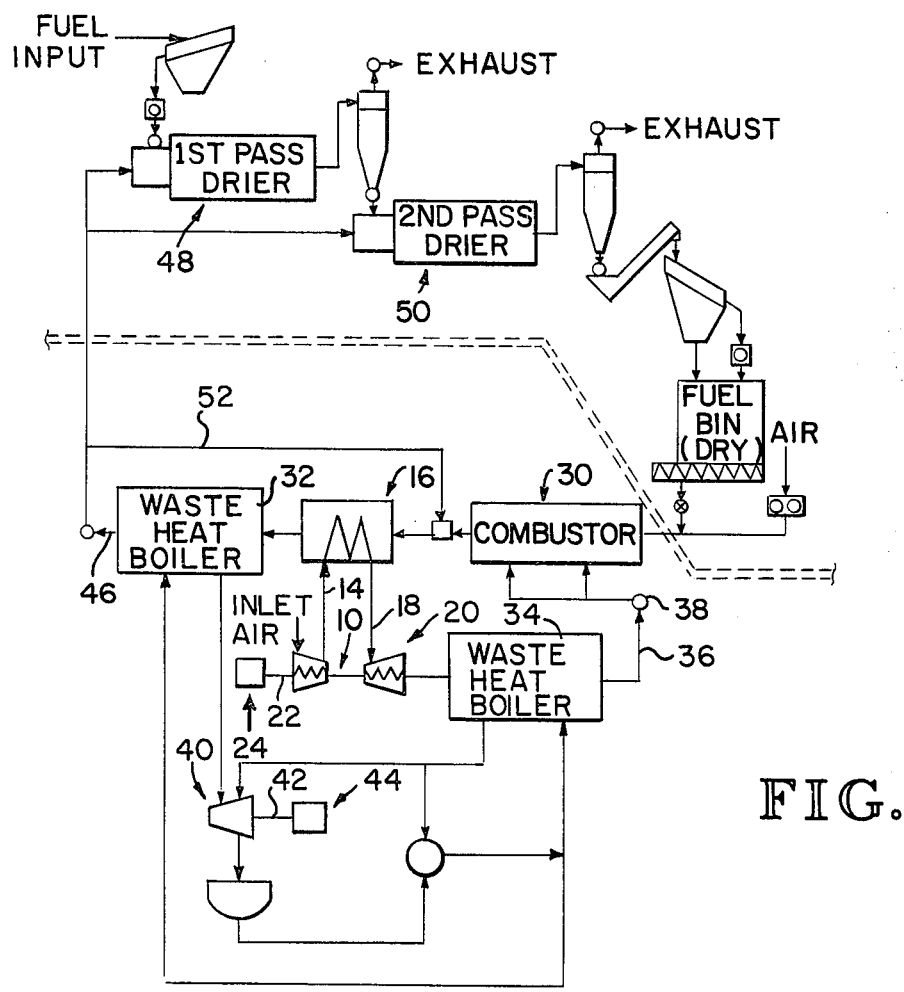
FIG. 2 is a schematic of an indirectly heated air turbine with steam recovered from the waste heat boilers used to generate electrical power and the waste heat used to dry the biomass fuel and provide preheated combustion air to a biomass combustion unit.

FIG. 2 illustrates a schematic of an indirectly heated, combined cycle system for generating electricity and utilizing waste heat for drying wet fuel prior to its being combusted. The system employs an indirectly heated gas turbine as described with respect to FIG. 1. A furnace 30 for combusting particulate biomass is employed. The furnace may be any of a number available commercially for firing biomass, such as the Lamb/Cargate wet cell referred to previously, the ROEMMC burner manufactured by Guaranty Performance Co., Inc., or others. The heated combustion gases from the furnace 30 are directed to a high temperature gas-to-air heat exchanger 16 and then, at a temperature of about 950° F., to waste heat boiler 32. Air at ambient temperature is drawn into the compressor section 12 of the gas turbine 10, where it is compressed and directed through the high temperature gas-to-air heat exchanger 16. The heated air from the heat exchanger 16 enters the power section 20 of the gas turbine through line 18 at a temperature ranging from 1400°-1600° F. and 100 to 150 psi to power the turbine. The output shaft 22 of the turbine is connected through a gear box to an electrical generator 24 to generate electrical power. The exhaust gases exiting the gas turbine as waste heat in the form of clean, heated air are directed through waste heat boiler 34 for recovery of the heat energy contained therein. The heated air exiting the waste heat boiler 34 through line 36 is directed to blower 38, which provides preheated combustion air for the furnace 30. Steam generated in the waste heat boiler 34, added to that generated by waste heat boiler 32, is used to power steam turbine 40, whose output shaft 42 is connected through a gear box to an electrical generator 44. The flue gases exiting the waste heat boiler 34 at a temperature of 300°-400° F. through line 46 are used to dry the wet biomass in rotary drum driers 48 and 50 before it is screened and fed to the furnace 30. A portion of these gases may be recycled through line 52 to the furnace 30. The balance of the heat energy in the flue gases is blended with vapor emitted by the drying process and is exhausted with the water vapor to the atmosphere at approximately 200° F.

Figure 3:
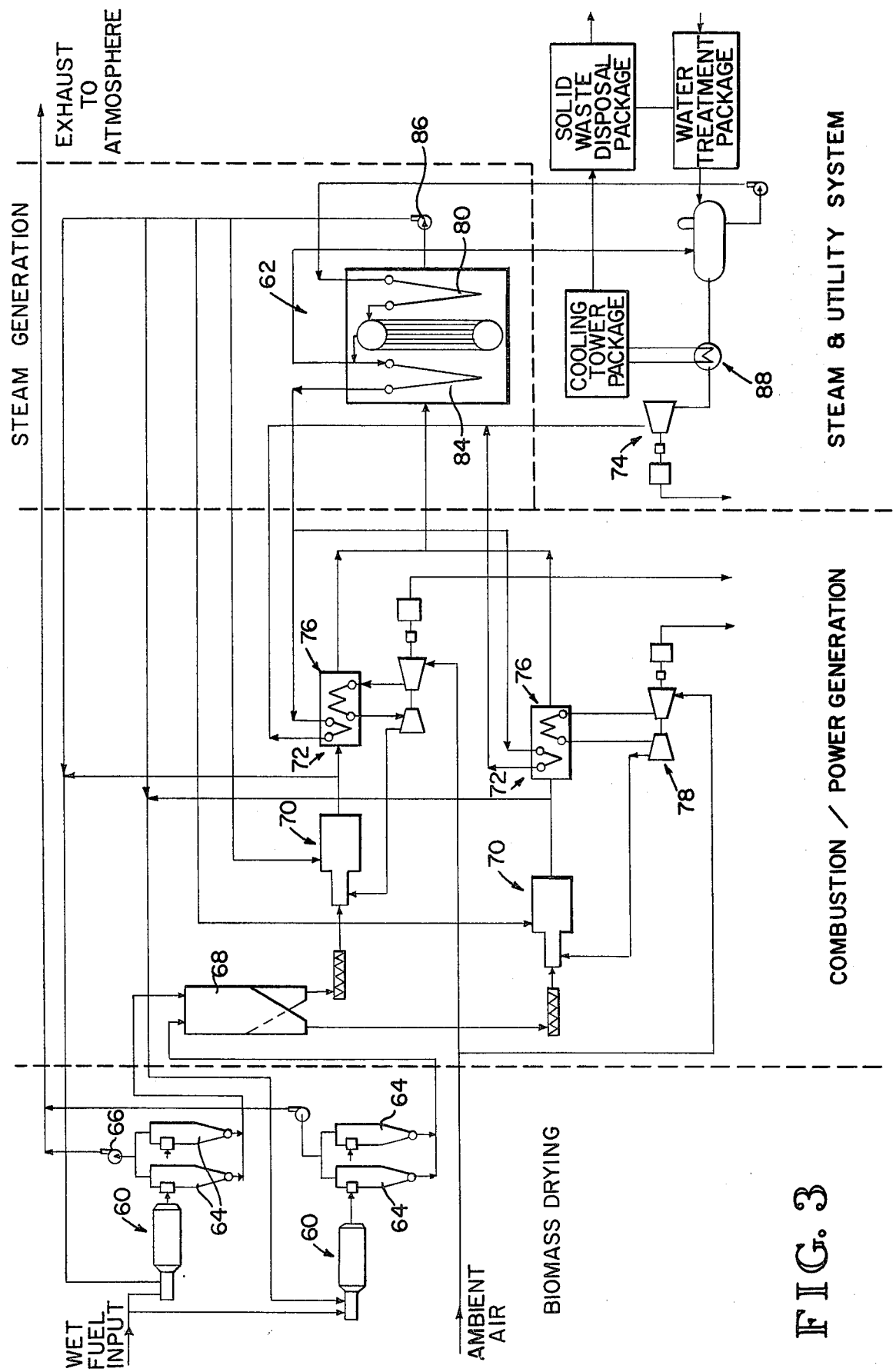
FIG. 3 is a schematic of a combined cycle system utilizing two gas turbines and two steam turbines for generating electricity from a high pressure steam unit.

FIG. 3 illustrates a schematic of a combustion/power generation system having three subsystems, one for biomass drying, one for combustion/power generation, and the third for steam and utility utilization. Dry wood waste containing up to 50 percent moisture is received in the facility either in chipped or whole form and is fed to two independent trains of 12 ft. diameter, 40 ft. length, three-pass rotary drum dryers 60 (such as manufactured by Guaranty Performance Company, Inc.) or an equivalent. Each dryer receives heated flue gases exiting from the steam boiler 62 at approximately 466° F. and essentially atmospheric pressure to aid in removal of the moisture content of the wood waste. On passage through the drum dryers, the moisture content of the wood waste is reduced to about 12 percent by evaporation against the hot flue gases. The dried wood waste and flue gases are then pneumatically conveyed to cyclones 64 in which the flue gases, now at about 190° F., are separated from the dried wood wastes and vented to the atmosphere through exhaust blowers 66.

The dried wood waste from the two trains of cyclones is fed by rotary feeders into a biomass storage bin 68 from which it is fed by screw feeders to two independently operated biomass burners 70 (such as the ROEMMC burners manufactured by Guaranty Performance Company). Each ROEMMC burner is a two-chamber device in which the dried wood waste is burned with a large excess of combustion air preheated to a temperature of about 700° F. Recycled flue gases exiting from the steam generator at about 350° F. are also directed to the burners. The burners are operated such that the outlet temperature of the combustion gases is about 1600°-1700° F. The second chamber of each of the burners is a cyclonic separator in which the unburned ash and any impurities brought in with the wood waste are separated and removed from the combustion flue gases.

The combustion flue gases from each burner, at a temperature of from 1600°-1700° F., pass into high pressure steam superheaters 72 which cool the flue gases to approximately 1625° F. by superheating 650 psia, 700° F. steam to approximately 900° F. These units may use conventional tube bellows constructed of Incology. This high pressure steam may be delivered to a steam turbine 74 for direct generation of electricity, as illustrated. The flue gases, now at about 1500°-1600° F., are then passed into gas-to-air heat exchangers 76 of the indirectly heated air turbines 78, as described previously. In passing through the gas-to-air heat exchangers, compressed air drawn into the inlet end of the compressor of each of the turbines at ambient temperature is heated to about 1000°-1100° F. This heated air is used to power the gas turbines to directly generate electricity. The gas turbines may be those manufactured by Solar Turbines International, an operating unit of International Harvester. The temperature limit in the gas-to-air heat exchangers should be maintained to keep the maximum tube wall temperature to about 1500° F. in order to permit the use of commercially available heat exchanger tube bundles, such as those manufactured by Coaltech of York, Pa. The heated air exits the power section of each of the gas turbines at a temperature of approximately 750° F. and slightly above atmospheric pressure and may be used to preheat the combustion air for each of the cyclone burners. This innovative approach allows recovery of essentially all of the heat energy contained in the exhaust air as useful energy.

The flue gases leaving the gas-to-air heat exchangers pass into and through the high pressure boiler 62, which has three sets of coils (a superheater 84, steam generator 82, economy 80). At this point, the two trains of flue gases are manifolded together for economies of scale. The three sets of coils of the boiler 62 include an economizer 80 in which 228° F., 250 psi boiler feed water is heated to near-saturation temperature, a steam generator 82 in which saturated steam is generated at about 700 psia, 900° F., and a high pressure steam superheated coil 84 which produces steam at 650 psia, 700° F. Flue gases leave the high pressure boiler at about 350° F., where they are compressed by fans 86 to overcome system pressure drop and delivered to the dryers 60 after being mixed with some of the hot flue gases exiting directly from the burners 70. The amount of hot flue gases blended with the exhaust gases from the steam boiler should be sufficient to increase the temperature of the heated gas stream to a desired temperature for drying the incoming fuel.

Steam at 900° F., 600 psia from the twin superheat coils of the high pressure steam generator is introduced to steam turbine/generator 74 for generation of electricity. The steam is reduced to 115° F., 3 in. mercury absolute pressure on passage through the steam generator. The uncondensed steam is condensed by cooling water in a condenser 88 and returned to the boiler 62 for resuse. Such a combined cycle system can produce about 4,500 KW of electricity via the gas turbines, plus about 5,000 KW electricity via the steam turbines, or a total of about 10 MW of power. The waste heat from the plant may also be used to heat veneer dryers used in drying veneers, to dry biomass for pelletizing in the production of a pelletized fuel, or for other purposes.

The overall efficiency of the power generation system is increased. Any pollution problems are significantly reduced by the highly unique application of the indirect heating and powering of a gas turbine with air heated by passage through a high temperature gas-to-air heat exchanger which is heated by hot combustion flue gases from a furnace directly fired by biomass, coal, or other fuel.

I claim:

1. An energy conversion system for production of electric power, comprising:
   a combustion unit for burning biomass fuel to produce hot combustion flue gases;
   a high temperature gas-to-gas heat exchanger through which a gaseous heat exchange fluid essentially free of particulate matter is passed and through which the hot combustion flue gases from the combustion unit are directed to heat the gaseous heat exchange fluid;
   a gas turbine directly connected to an electrical generator, the turbine including a compressor section for compressing the gaseous heat exchange fluid and a power section for powering the electrical generator;
   means for directing the compressed gaseous heat exchange fluid through the high temperature gas-to-gas heat exchanger and then directing the heated heat exchange fluid through the power section of the turbine;
   a steam generator;
   means to deliver the hot combustion flue gases, after their passage through the gas-to-gas heat exchanger, to the steam generator;
   one or more dryer units for removing moisture from the biomass prior to combustion; and
   means to direct residual heat energy contained in the combustion flue gases, after their passage through the steam generator, to the dryer units to aid in drying of the biomass fuel.

2. The conversion system of claim 1, including a steam turbine connected to an electrical generator, the steam turbine operated on steam generated by the steam generator.

3. The conversion system of claim 1 wherein the heat exchanger is a high temperature gas-to-air heat exchanger and the gaseous exchange fluid is air.

4. The conversion system of claim 1, including means directing the exhaust gases from the gas turbine to the combustion units for use as preheated combustion air.

5. The conversion system of claim 1, including a pair of waste heat boilers, one heated by the exhaust gases from the gas turbine and the other by the hot combustion flue gases after their passage through the gas-to-gas heat exchanger, a steam turbine powered by steam from the boilers for generating electricity and means for delivering steam generated by the waste heat boilers to the steam turbine.

6. A method of increasing the eficiency of a gas and/or steam turbine used for generating electrical energy, comprising:
   burning a biomass fuel to generate hot combustion gases;
   directing the hot combustion gases through a high temperature gas-to-gas heat exchanger;
   compressing a gaseous fluid essentially free of particulate matter and at ambient temperature by passage through the compressor of a gas turbine directly connected to an electrical generator;
   passing the compressed gaseous fluid through the gas-to-gas heat exchanger to heat the compressed gaseous fluid;
   passing the compressed, heated gaseous fluid through the power section of the gas turbine generate electricity;
   utilizing the hot combustion gases, after passage through the gas-to-gas heat exchanger to generate steam;
   utilizing the stream to drive a steam turbine directly connected to an electrical generator for generation of electricity;
   utilizing the residual heat contained in the combustion gases, after being used to generate steam, to dry the biomass fuel prior to combustion thereof; and
   utilizing the residual heat contained in the exhaust gases from the gas turbine as preheated combustion air for combustion of the biomass.

7. A combined cycle system utilizing a gas turbine in combination with a steam turbine for generation of electricity, the system combining two thermodynamic cycles, the Brayton and the Rankine cycles, comprising:
   a combustion unit for burning of a biomass fuel to produce hot combustion flue gases;
   a high temperature gas-to-air heat exchanger through which air is passed and through which the hot combustion gases from the biomass combustion unit are directed;
   a gas turbine directly connected to an electrical generator, the turbine including a compressor section for compressing air and a power section for turning the electrical generator;
   means directing the compressed air from the compressor section of the turbine through the high temperature gas-to-air heat exchanger and then directing the compressed, heated air through the power section of the turbine;
   a steam generator;
   means to deliver the hot combustion flue gases after their passage through the gas-to-air heat exchanger to the steam generator for generation of steam;
   a steam turbine connected to an electrical generator;
   means to deliver steam from the steam generator through the steam turbine;
   one or more dryer units for removing moisture from the biomass prior to combustion thereof; and
   means to direct flue gases containing residual heat energy, after their passage through the steam generator, to the dryer units to aid in drying of the biomass fuel.

8. The energy conversion system of claim 7, including means directing the exhaust air from the power section of the gas turbine to the biomass combustion unit to serve as preheated combustion air therefor.

9. The conversion system of claim 7 wherein the system includes one or more dryer units for removing moisture from the biomass prior to combustion thereof and wherein means are included to direct flue gases containing residual heat energy, after their passage through the steam generator, to the dryer units to aid in drying of the biomass fuel.

10. A method of efficiently producing electrical power utilizing two types of generation systems, i.e., a gas turbine in combination with a steam turbine, for the efficient production of electrical energy from a biomass fuel, comprising:

burning the biomass fuel with preheated combustion air to generate hot combustion gases at a temperature of 1500°–1700° F.;

directing the hot combustion gases to a high pressure steam superheater which cools the combustion gases to about 1500°–1650° F. by superheating steam at 650 psia, 700° F. to about 900° F.;

passing the flue gases at a temperature of about 1450°–1600° F. from the high pressure steam superheater into a high temperature gas-to-air heat exchanger;

compressing air at ambient temperature by passage through the compressor of a gas turbine directly connected to an electrical generator;

passing the compressed air through the gas-to-air heat exchanger for heating thereof to a temperature of about 1000°–1100° F.;

passing the heated compressed air through the power section of the gas turbine for generation of electricity, the heated air exhausting from the gas turbine at a temperature of about 750° F. and slightly above atmospheric pressure;

directing the combustion gases, after passage through the gas-to-air heat exchanger, to a steam boiler for generation of high pressure steam at 650 psia and about 750° F.;

utilizing the high pressure steam to drive a steam turbine directly connected to an electrical generator for generation of electricity;

using the exhaust gases from the air turbine at a temperature of about 700° F. for preheated combustion air; and using the combustion flue gases after their passage through the steam generator at a temperature of about 350° F. for predrying of the biomass prior to combustion thereof.

* * * * *